3,758,323
DEXTRIN-EXTENDED GELATIN COMPOSITIONS

Chester D. Szymanski, Martinsville, and Gerald J. Helmstetter, Somerville, N.J., assignors to National Starch and Chemical Corporation, New York, N.Y.
No Drawing. Filed Oct. 19, 1972, Ser. No. 298,843
Int. Cl. C08b 25/02; C08h 7/00
U.S. Cl. 106—129                4 Claims

ABSTRACT OF THE DISCLOSURE

Extended gelatin film-forming compositions are disclosed comprising 40 to 97 percent, by weight, of gelatin and 3 to 60 percent, by weight, of certain dextrins chosen by means of a compatibility test. The extended gelatin compositions are useful in films, capsules, and protective coatings.

BACKGROUND OF THE INVENTION

This invention relates to extended gelatin compositions useful as film-forming materials. More particularly, it relates to extended gelatin compositions containing certain degraded starch products, namely dextrins.

In the term, "gelatin," we mean to include any proteinaceous material derived by hydrolytic extraction of collagen obtained from the bones, skins, and connective tissues of animals. Such materials may be obtained by hydrolytic extraction in an alkaline (lime) or an acidic medium and thereafter treated for use in a particular industry. For example, the gelatin may be produced by accurately controlling the depolymerization of the protein collagen and then chemically refined, e.g., by ion exchange to meet the specifications appropriate for the particular industry.

In the manufacture of pharmaceutical capsules and coatings the gelatin films must possess certain desirable properties, e.g., good film strength, insolubility in cold water, oil, and alcohol, solubility in hot water, pressure sealability, film clarity, film flexibility, edibility, inertness to drugs or other materials to be encapsulated, and rapid setting from solution to form a gel. In the manufacture of photographic elements the gelatin must possess the necessary qualities of clarity, strength, setting power, and flexibility.

Although gelatin is useful for its rapid gelling ability, excellent film forming properties, and ability to impart oxygen impermeability, it has the disadvantages of high cost, limited availability, and, at times batch property variations. Because of these shortcomings, those industries where the need for gelatin is greatest have long sought a means of extending or replacing gelatin.

The replacement of all the gelatin by certain synthetic polymers results in the loss of the outstanding film forming, stability, and swelling properties of the original gelatin. The replacement of part of the gelatin with such materials may, for similar reasons, also be impractical.

It is well known that dextrins are widely used for thickening colors in calico paints, thickening tanning extracts, and, perhaps, more extensively in the confectionery and brewing industries, and in making mucilage for paper and cardboard products. However, the use of dextrins has been limited to such non-film-forming applications, since it was felt that firm, non-tacky, and non-brittle films could not be produced, using dextrin as a gelatin extender.

In order for any material to be useful as a gelatin extender, it must not only be compatible with the gelatin and stable in mixtures thereof, but must not impair the properties of the gelatin which are required in a particular use, e.g., phototransmissibility and resistance to abrasion in the photographic industry and binding strength in the adhesive industry.

SUMMARY OF THE INVENTION

It is the prime object of this invention to provide an economical means for extending aqueous, gelatin compositions utilized in industrial applications. It is a further object of this invention to provide gelatin materials extended with starch derivatives so as to yield smooth, non-grainy dispersions.

We have found that particular dextrins, when incorporated in aqueous, gelatin solutions, display outstanding compatibility and dispersion stability in the presence of the gelatin. More precisely, we have found that dextrins which exhibit these unusual capabilities, as determined by the following compatibility test, may be utilized to extend gelatin in film-forming compositions.

To evaluate any particular dextrin for its utility in the preparation of the novel, extended gelatin compositions, the dextrin is mixed with the hydrated gelatin at ratios ranging from about 3 to 60 percent of dextrin, by weight, and about 97 to 40 percent of gelatin, by weight, based on the total solids, and the solution is held at about 137° F. (58° C.) for at least 16 hours. The gelatin component is prepared by suspending the desired amount in cold water and then heating the suspension at about 140° F. (60° C.) under moderate stirring until completely dispersed. The dextrin component is prepared by cooking a slurry of the desired amount of the dextrin at between 200 and 212° F. (93–100° C.) for about 20 minutes and then cooling the cook to about 140° F. (60° C.) prior to admixing with the gelatin. In any instance the quantities of the dextrin and the gelatin are in reciprocal amounts such that the total solids is 30 percent, by weight, of the final solution. Following the holding period compatibility and stability are evaluated based on a visual examination of the solution. Only those dextrin-gelatin mixtures which yield a test solution free from any phase separation or sediment are useful as extended gelatin compositions according to this invention.

Gelatin compositions extended with dextrin in the proportions within the limits which fulfill the conditions of the above test are found to have the ability to rapidly congeal and form tough, films comparable to those obtained using the gelatin alone.

As is well known in the art, dextrins are the conversion products formed by the incomplete degradation of starch as a result of either heating the starch alone or in the presence of an acidic or an enzymic modifier. It should be noted that the term, "dextrin," as referred to in the process of this invention, includes any products obtained by any conversion or "dextrinization" procedure contemplated within the usual scopes of the aforementioned methods.

DESCRIPTION OF THE PREFERRED EMBODIMENTS

According to our invention, the useful dextrins based on the above-described compatibility test may be those obtained by any dextrinization procedure from any plant source including corn, waxy maize, potato, wheat, rice, sago, tapioca, sorghum, high amylose corn, and the like. Also included among the dextrins suitable for use in the practice of this invention are those dextrins prepared from thin boiling starches or acid or enzyme converted starches.

As previously indicated, such materials may be of the British gum type prepared by heating the starch alone at temperatures between 170° C.–195° C.; the White dextrin type, those pyrodextrins which are acid converted at relatively low temperatures between 80°–120° C.; or the Yellow (Canary) dextrin type, those pyrodextrins which are acid converted at relatively higher temperatures between 150–180° C., as well as those thermally converted from waxy maize.

Since the usefulness of any dextrin, as a gelatin extender, is determined solely on the basis of its compatibility and stability in an aqueous-gelatin solution according to the above-described test, any type dextrin obtained from any suitable starch, capable of displaying the desired properties may be used.

The particular dextrin chosen will depend, not only on its applicability, but also the availability of the parent starch and the cost of dextrinization. Depending on the types of starches utilized and the varied degrees of dextrinization, the various types of dextrins may differ considerably one from the other in structure and in properties. For example, the temperature and duration of the dextrinization process and the amount of acid or enzyme present, when used, may be varied so as to produce several dextrins having significantly different properties, i.e. viscosity, solubility, and color, etc., from the same parent starch.

In converting the starches into dextrins, one may employ any of the usual dextrinization procedures well known to those skilled in the art. Such methods include those taught in, inter alia, U.S. Pats. 2,359,378 and 2,698,818. Additional information relating to dextrinization may be obtained by reference to Chapters XII–XIII of "Chemistry and Industry of Starch" by R. W. Kerr, New York, 1950 and vols. I and II of "Starch: Chemistry and Technology" by R. L. Whistler and E. F. Paschall, New York, 1965.

With regard to proportions, the concentration of the dextrin may range from about 3 to 60 percent, preferably 15 to 40, based on the total weight of the solids.

For example, it is preferred that a yellow dextrin prepared by heating waxy maize in the presence of an acid be used as an extender in amounts ranging from 15 to 40 percent, based on the total weight of the gelatin and dextrin.

The extended gelatin compositions of this invention are prepared by mixing the gelatin and the dextrin extender in aqueous solution containing from 1 to 45 percent total solids, then drying the composition after it is put into a desirable form such as a film or a capsule, to a moisture content of no more than 25 percent, by weight.

The films obtained from the novel, extended compositions according to this invention may be made by any conventional method designed to deposit a continuous coating or layer of the solution onto a substrate or mold of any form. Among the various techniques of coating are included spraying, dipping, air knife, trailing blade, reverse and direct roll coaters, etc. A film such as an overcoating or capsule shell may then be formed by drying the coated solution to a desired moisture content, using any means suitable for the perticular purpose. Suitable conventional means are air, warm or cold air impingement, low humidity chamber or oven drying, etc. For example, in the pharmaceutical industry, the hard shell capsules are prepared by automatically dipping metal tynes or mold pins into the heated solution (about 137° F. or 39° C.) and moving the coated tynes through a series of drying kilns which are set to precisely control dehydration. Prior to drying the coated tynes may be subjected to a blast of cold air to facilitate gelling.

The soft shell capsules are prepared by casting a film of the gelatin solution and then continuously passing two ribbons of the said film between two opposing rollers, each of which is equipped with an internal vacuum that draws in the film through half capsule wells engraved in its surface. The capsule contents are deposited between the shell halves as they are formed and sealed. The process is continuous, ending with the filled capsule being automatically conveyed to and through a wash unit and a drying unit which partially dries the capsule. Drying is completed in warm air tunnels.

In the following examples the film samples were prepared by casting a layer of the test solution at about 140° F. (60° C.) onto a 6 inch x 15 inch (15 cm. x 38 cm.) chrome plate by means of a Bird Applicator and drying at 75° F. (24° C.) and 55 percent relative humidity.

Film appearance was evaluated on the basis of visual observations. The film-forming ability of the test solution and the quality of the film thus formed were evaluated on the basis of the following tests:

Moisture content: The moisture content of film samples was determined using a Cenco Moisture Balance (Model No. 26675).

Tensile strength (T.S.): The tensile strength of film strips 1.0 x 0.5 inches (2.5 x 1.25 cm.) was determined with an Instron Strength Testing Machine (Model No. T.T.C.).

Flexibility: To determine the flexibility ⅝ inch x 6 inch (1.5 cm. x 15 cm.) strips were tested by repeated folding until failure on a Folding Endurance Tester (Tinius Olsen). Results were calculated as follows:

$$\text{Flexibility} = \frac{\text{Nos. of flexes to breaking}}{\text{Avg. film thickness (mils)}^1}$$

The invention will be further illustrated by, but is not intended to be limited to, the following examples. In all examples, the amounts of starch are given as percent, by weight, of the total solids.

Example I

This example illustrates the usefulness of a particular commercial pyrodextrin, formed in the presence of acid, in the preparation of a novel composition of this invention.

In this instance, a yellow dextrin (viscosity of 68 Stormer grams) obtained by acid-catalyzed pyrolysis of a waxy maize base using a conventional method was employed. The test composition comprising 30 percent, by weight, total solids of which 15 percent of said solids was the dextrin extender prepared as follows:

(A) There was introduced into a vessel equipped with a mechanical means of agitation and containing 45.0 milliliters of water and 25.5 grams of gelatin. The suspension was then heated to and maintained at about 140° F. (60° C.) for 1 hour with intermittent stirring to ensure homogeneity.

(B) In a separate container equipped with a mechanical means of agitation and having 25.5 milliliters of water there were suspended 4.5 grams of the above-described dextrin. This slurry was cooked at about 185° F. (85° C.) for 15 minutes and cooled to about 140° F. (60° C.). The gelatin and the dextrin solutions were mixed and then allowed to stand for 16 hours at 140° F. (60° C.) along with a control having 30 percent, by weight, of gelatin. Upon completion of the holding period, the solutions were compared.

In the dextrin extended sample there was observed a very slight cloudiness. However, this solution, like the control, remained homogeneous. It showed no phase separation or sediment. Film samples were obtained from these solutions and tested in the manner described above. Results of the film tests are presented in Table I below.

TABLE I

| Film sample | Appearance | Moisture content (percent) | Strength (p.s.i.) | Flexibility |
|---|---|---|---|---|
| Test | Very slight haze | 20 | 11,375 | 2.40 |
| Control | Clear | 16 | 12,200 | 4.20 |

As indicated in the above summarized data, a yellow dextrin of this type is quite useful in the practice of this invention. The dextrin extender did not impair the gelling and the film-forming abilities of the gelatin.

The film thus formed was free of any perceptible defects, except for a very slight cloudiness, and displayed excellent dimensional characteristics.

[1] 1 mil = 0.001 inch = 0.0025 cm.

Example II

This example illustrates the usefulness of an acid converted, pyrodextrin at varied concentrations in the preparation of the extended gelatin compositions in accordance with this invention.

Using a sufficient quantity of a yellow dextrin obtained from waxy maize similar to that employed in Example I, the procedures of that same example were repeated in the preparation of a series of sample compositions, A–D, having varied amounts of dextrin and gelatin. All samples contained 30 percent, by weight, total solids of which the dextrin component was regulated between 0 and 20 percent. The resultant solutions and the film obtained therefrom were evaluated and tested, along with gelatin controls, according to the methods set forth in Example I. Comparative results are presented in Table II below.

TABLE II

| Sample | Gelatin: dextrin ratio | Film thickness in mils | Moisture content (percent) | Strength (p.s.i.) | Flexibility |
|---|---|---|---|---|---|
| Control (A) | 100:0 | 5.45 | 16.0 | 12,200 | 4.16 |
| B | 90:10 | 6.49 | 15.1 | 11,925 | 2.50 |
| C | 85:15 | 6.40 | 20.0 | 11,375 | 2.44 |
| D | 80:20 | 5.57 | 15.7 | 11,575 | 2.25 |

As indicated by the data summarized above, this particular pyrodextrin may be used in varied amounts to extend gelatin in accordance with this invention. The dextrin used herein remained compatible with the gelatin, and the mixtures were stable throughout the entire series.

Example III

This example illustrates the usefulness of a dextrin-extended gelatin composition typical of this invention in the preparation of gelatin capsules.

Using a gelatin having a gel strength above 230 (based on standard gelometer determination) and a yellow dextrin of waxy maize, the procedural steps of Example I were repeated. The extended gelatin composition was then used to prepare hard shell capsules as follows:

The capsules were prepared by dipping lubricated tynes into the dextrin extended gelatin composition, withdrawing and placing the solution coated tynes in a forced air oven set at about 87° F. (31° C.) until dry. The capsule halves were removed from the tynes and trimmed.

When compared with a control capsule obtained from a gelatin solution, the sample capsules were similar in appearance and flexibility.

An advantage of our invention is that it provides a simple, dependable, and efficient means for extending the gelatin used in gelatin compositions.

Another advantage of our invention is that the preparation of the present, novel compositions merely involves the admixing of the dextrin with the hydrated gelatin. No special technique is required. The operation can be carried out by ordinary means with conventional apparatus. The resulting starch extended compositions can be utilized in any commercial process requiring gelatin and to which conventional coating and drying methods are adaptable.

Though the invention is particularly efficacious in the pharmaceutical and photographic products which call for film forming materials, it is not limited thereto. The characteristics exhibited by the present, novel extenders, particularly their ready compatibility with the gelatin, permit them to be used in a wide range of applications. A wide variety of optional ingredients may be incorporated into the gelatin compositions of this invention either prior to or after admixing the starch extender. Among the prominent additives which may be utilized are included plasticizers, preservatives, colorants, flavoring agents, hardeners, antifoggers, sensitizers, and spreading agents. It should be noted that the inclusion of such additives has no adverse effect upon the properties exhibited by our novel extended, gelatin compositions.

Summarizing it is thus seen that this invention provides a novel, efficient means for extending gelatin.

It is to be noted, that although the emphasis has been placed on describing this invention in connection with film-forming gelatin compositions, the various pyrodextrins may accordingly be utilized as extenders in gelatin compositions such as creams, emulsions, binders, etc.

Variations in materials, proportions, and procedures may be made without departing from the scope and spirit of this invention as defined by the following claims.

What is claimed is:

1. An extended gelatin composition comprising an equilibrium amount but no more than 25 percent, by weight, of water, the remainder of said composition comprising 40 to 97 percent, by weight, of gelatin and 3 to 60 percent, by weight, of a dextrin chosen so that an aqueous solution containing 30 percent, by weight, total solids comprising the chosen proportions of said dextrin and gelatin, held at a temperature of 137° F. (58° C.) for 16 hours exhibits no phase separation.

2. The extended gelatin composition of claim 1, wherein said dextrin is a thermally-converted product of waxy maize.

3. The extended gelatin composition of claim 1, wherein said dextrin is a hydrolytically, thermally converted product of waxy maize.

4. A pharmaceutical capsule shell having a wall consisting essentially of an extended gelatin composition comprising an equilibrium amount but no more than 25 percent, by weight, of water, the remainder of said composition comprising 40 to 97 percent, by weight, of gelatin, and 3 to 60 percent, by weight, of a dextrin chosen so that an aqueous solution containing 30 percent, by weight, total solids comprising the chosen proportions of said dextrin and gelatin, held at a temperature of 137° F. (58° C.) for 16 hours exhibits no phase separation.

References Cited
UNITED STATES PATENTS

| | | | |
|---|---|---|---|
| 2,800,457 | 7/1957 | Green et al. | 106—157 |
| 2,477,912 | 8/1949 | Vallandigham | 106—208 |
| 2,791,512 | 5/1957 | Hatch et al. | 106—208 |

OTHER REFERENCES

Chem. Abstract, 65: 17260–17261, 1965.

THEODORE MORRIS, Primary Examiner

U.S. Cl. X.R.
106—130, 157, 208